(12) United States Patent
Siebert et al.

(10) Patent No.: US 10,831,887 B2
(45) Date of Patent: Nov. 10, 2020

(54) SYSTEM AND METHOD FOR MONITORING THE INTEGRITY OF A COMPONENT DELIVERED TO A CLIENT SYSTEM BY A SERVER SYSTEM

(71) Applicant: G DATA Software AG, Bochum (DE)

(72) Inventors: Thomas Siebert, Bottrop (DE); Karsten Tellmann, Bochum (DE)

(73) Assignee: G DATA SOFTWARE AG, Bochum (DE)

(*) Notice: Subject to any disclaimer, the term of this patent is extended or adjusted under 35 U.S.C. 154(b) by 107 days.

(21) Appl. No.: 15/568,389

(22) PCT Filed: Apr. 18, 2016

(86) PCT No.: PCT/EP2016/000630
§ 371 (c)(1),
(2) Date: Oct. 20, 2017

(87) PCT Pub. No.: WO2016/169646
PCT Pub. Date: Oct. 27, 2016

(65) Prior Publication Data
US 2018/0157830 A1 Jun. 7, 2018

(30) Foreign Application Priority Data

Apr. 21, 2015 (DE) .................. 10 2015 005 071

(51) Int. Cl.
*G06F 21/54* (2013.01)
*H04L 29/06* (2006.01)
*G06F 21/53* (2013.01)

(52) U.S. Cl.
CPC ............ *G06F 21/54* (2013.01); *H04L 63/123* (2013.01); *H04L 63/1416* (2013.01);
(Continued)

(58) Field of Classification Search
CPC ..... G06F 21/54; G06F 21/53; H04L 63/1426; H04L 63/168; H04L 63/123
See application file for complete search history.

(56) References Cited

U.S. PATENT DOCUMENTS 8,677,481 B1 3/2014 Lee
8,931,084 B1 1/2015 Paya et al.
(Continued)

OTHER PUBLICATIONS

Farrell, S. et al., "Naming Things With Hashes," Internet Engineering Task Force (IETF) Request for Comments 6920, Standards Track, Available Online at https://tools.ietf.org/html/rfc6920, Apr. 2013, 46 pages.
(Continued)

*Primary Examiner* — Sher A Khan
(74) *Attorney, Agent, or Firm* — McCoy Russell LLP (57) ABSTRACT

The present invention relates to a system for monitoring the integrity of a component delivered to a client system by a server system and processable and/or executable on the client system, having an integration system and having a sensor, wherein the integration system integrates the sensor into the component delivered by the server system to the client system, and wherein the sensor is configured such that it is executed on the processing and/or execution of the component and recognizes modifications of the component.

17 Claims, 2 Drawing Sheets

(52) U.S. Cl.
CPC ............ *H04L 63/168* (2013.01); *G06F 21/53* (2013.01); *G06F 2221/033* (2013.01)

(56) References Cited

U.S. PATENT DOCUMENTS

| | | | | |
|---|---|---|---|---|
| 9,294,492 | B1* | 3/2016 | Martini | H04L 63/1416 |
| 9,350,750 | B1* | 5/2016 | Aval | H04L 63/1416 |
| 9,734,503 | B1* | 8/2017 | Gargi | G06Q 30/0631 |
| 9,867,051 | B2* | 1/2018 | Park | H04W 12/0027 |
| 2004/0230797 | A1* | 11/2004 | Ofek | G06F 21/14 |
| | | | | 713/168 |
| 2006/0089969 | A1* | 4/2006 | Brown | G06Q 10/10 |
| | | | | 709/203 |
| 2007/0150948 | A1* | 6/2007 | De Spiegeleer | G06F 21/56 |
| | | | | 726/22 |
| 2007/0288696 | A1* | 12/2007 | Repasi | G06F 21/51 |
| | | | | 711/135 |
| 2008/0005095 | A1* | 1/2008 | Horvitz | G06F 16/951 |
| 2008/0267406 | A1* | 10/2008 | Asokan | H04L 63/12 |
| | | | | 380/277 |
| 2008/0304518 | A1* | 12/2008 | Cheng | H04L 67/20 |
| | | | | 370/474 |
| 2009/0049510 | A1* | 2/2009 | Zhang | G06F 21/53 |
| | | | | 726/1 |
| 2009/0064328 | A1* | 3/2009 | Ahn | G06F 21/564 |
| | | | | 726/22 |
| 2009/0307766 | A1* | 12/2009 | Rose | H04L 1/02 |
| | | | | 726/13 |
| 2009/0328164 | A1* | 12/2009 | Sunder | G06F 21/57 |
| | | | | 726/5 |
| 2010/0058353 | A1* | 3/2010 | Turski | G06F 9/547 |
| | | | | 719/311 |
| 2011/0010533 | A1* | 1/2011 | Buford | G06F 9/468 |
| | | | | 713/150 |
| 2011/0178999 | A1* | 7/2011 | Banatre | G08B 13/14 |
| | | | | 707/701 |
| 2011/0321139 | A1* | 12/2011 | Jayaraman | G06F 21/51 |
| | | | | 726/4 |
| 2012/0266241 | A1* | 10/2012 | Buescher | G06F 21/52 |
| | | | | 726/22 |
| 2012/0272317 | A1* | 10/2012 | Rubin | G06F 21/552 |
| | | | | 726/23 |
| 2012/0323700 | A1* | 12/2012 | Aleksandrovich | G06Q 30/00 |
| | | | | 705/14.69 |
| 2014/0189490 | A1* | 7/2014 | Ahmed | G06F 40/197 |
| | | | | 715/234 |
| 2014/0189808 | A1* | 7/2014 | Mahaffey | H04L 63/083 |
| | | | | 726/4 |
| 2014/0330834 | A1* | 11/2014 | Auriemma | G06F 17/2247 |
| | | | | 707/741 |
| 2016/0019122 | A1 | 1/2016 | Johnson, III | |
| 2016/0098561 | A1* | 4/2016 | Keller | G06F 21/567 |
| | | | | 726/24 |

OTHER PUBLICATIONS

Thober, M. et al., "Ensuring the Integrity of Running Java Programs," Johns Hopkins APL Technical Digest, vol. 32, No. 2, Sep. 2013, 11 pages.

Braun, F. et al., "Subresource Integrity," W3C First Public Working Draft, Available Online at https://www.w3.org/TR/2014/WD-SRI-20140318/, Mar. 18, 2014, 25 pages.

Obfuskation, Wikipedia Website (German Language), Available Online at https://de.wikipedia.org/w/index.php?title=Obfuskation&oldid=140544634, As last edited Apr. 3, 2015, 16 pages. (Submitted with Machine Translation).

ISA European Patent Office, International Search Report Issued in Application No. PCT/EP2016/000630, dated Jun. 20, 2016, WIPO, 6 pages.

* cited by examiner

SYSTEM AND METHOD FOR MONITORING THE INTEGRITY OF A COMPONENT DELIVERED TO A CLIENT SYSTEM BY A SERVER SYSTEM

CROSS-REFERENCE TO RELATED APPLICATIONS

The present application is a U.S. National Phase of International Patent Application Serial No. PCT/EP2016/000630, entitled "SYSTEM AND METHOD FOR MONITORING THE INTEGRITY OF A COMPONENT DELIVERED BY A SERVER SYSTEM TO A CLIENT SYSTEM," filed on Apr. 18, 2016. International Patent Application Serial No. PCT/EP2016/000630 claims priority to German Patent Application No. 10 2015 005 071.0, filed on Apr. 21, 2015. The entire contents of each of the abovementioned applications are hereby incorporated by reference in their entirety for all purposes.

TECHNICAL FIELD

The present invention relates to a system and to a method for monitoring the integrity of a component delivered to a client system by a server system and processable and/or executable on the client system. The component can in this respect in particular be a website which is processed or executed on a web browser working as a client system.

BACKGROUND

Due to the introduction of modern web technologies such as HTLM5 and CSS3, today's web browsers offer technical possibilities to model classical processes in the form of web applications.

The functionality of websites is in this respect as a rule provided both by components on the server side such as a web server, a software back end and a database link of the web server and via components on the client side which are executed in the web browser of the actual customer. The client-side components are in this respect transmitted as part of the presentation of a website by the web server to the browser of the customer, with the components being HTML code or JavaScript code, for example.

The component transferred in accordance with the invention is such a component at the client side. In contrast, as part of the present invention, components of the actual browser and its extensions such as plug-ins are not looked at any further.

Traditional implementations of such systems implement a large part of the actual process logic on the server side. However, the implementation of this process logic is being moved more and more into the components of such systems at the client side due to the technical possibilities of today's browser versions.

The technologies on the client side have hereby come into the focus of attackers. Malicious software or manual attackers directly attack the components on the client side in the customer's browser to steal sensitive data, for example. A manipulation of the original client components is carried out for this purpose to modify or monitor the actual behavior of these components. Since this type of manipulation only takes place at the client side, protection technologies on the server side cannot recognize it.

It is therefore the object of the present invention to provide a system for monitoring the integrity of a component delivered to a client system by a server system and processable and/or executable on the client system, i.e. a component in accordance with the invention on the client side.

SUMMARY

The present invention comprises a system for monitoring the integrity of a component delivered to a client system by a server system and processable and/or executable on the client system, said system comprising an integration system and a sensor. In this respect, the integration system integrates the sensor into the component delivered to the client system by the server system. The sensor is configured such that it is executed on the processing and/or execution of the component and recognizes modifications of the component. A protection technology on the client side is thus provided by the present invention which is co-executed on the processing or execution of the component on the client side and recognizes modifications of the component.

The integration system can in this respect be part of the server system or part of the client system or can be provided by an interposed proxy. An integration of the integration system into the client system can in this respect in particular take place when there are a plurality of logical planes in the client system, with the integration of the sensor by the integration system taking place at a plane above the expected attack. The integration system can in this respect, for example, be located in the client system in the manner of a local proxy server upstream of the actual client system.

The integration system, however, preferably forms a part of the server system or of an interposed proxy. This has the advantage that the service operator operating the server system can deliver the protection technology provided by the sensor without the customer having to take independent action or even just having any influence thereon.

In a preferred embodiment of the present invention, the integration system equips the sensor with information on the delivered state of the component and/or with an identifier of the delivery process. The information on the delivered state of the component allows the sensor to make a comparison with the current state of the component and thus allows an identification of modifications. The identifier allows an association of a report to a specific delivered component on a communication of the sensor with other components of the system.

The sensor can furthermore be integrated into the component or the sensor can carry out such actions that the sensor can no longer be removed by subsequent manipulations. Corresponding attributes of the sensor can in particular be set within the component for this purpose.

In a preferred embodiment, the integration system conceals the sensor within the framework of the integration or after the integration. It should hereby be prevented that an attacker recognizes the sensor within the component and can remove it.

Provision is made in a possible embodiment that the integration system dynamically modifies the sensor for the integration. The recognizability of the sensor within the component should hereby be reduced. Provision can in particular be made that the integration system changes variable names and/or function names and/or the size of the sensor. The position of the sensor within the component can furthermore be changed. The change in this respect preferably takes place for a plurality of integration processes and preferably for every integration process in a different and/or random manner.

Provision can furthermore be made that the integration system changes both the sensor and one or more constituent parts of the delivered component for the purpose of concealment. The change of the other constituent parts of the delivered component likewise prevents an easy recognizability of the sensor within the component. The change also preferably takes place here in a plurality of integration processes and preferably in every integration process in a different and/or random manner.

Provision can furthermore be made that the integration system encodes the sensor and/or one or more constituent parts of the delivered component within the framework of the integration of the sensor. The encoded constituent parts in this respect preferably only get their original sense back in the processing and/or execution of the component. The total program code of the delivered component can in this respect in particular be encoded after the integration. Such an encoding in this respect protects against static analysis processes since the original sense of the individual constituent parts of the component only results on the processing or execution of the component. Most malware in contrast only has static analysis processes and cannot recognize the sensor.

The system in accordance with the invention can furthermore comprise a reference proxy which changes references of the sensor and/or of the delivered component prior to the delivery of the component to the client system and/or addresses them to itself. It is hereby prevented that the sensor becomes recognizable again by its references. The references are in particular references to external code and/or to URLs.

The change and/or new addressing of the references in this respect preferably takes place with a plurality of delivered components and preferably with each delivered component in a different and/or random manner.

The reference proxy is in this respect preferably configured such that, on a call of the changed references and/or of the references addressed to it, it forwards the call to the original references.

The reference proxy can in this respect store an association between the changed references and/or the references addressed to itself and the original references together with an identifier of the delivery process. If a corresponding call then follows, it is forwarded to the original reference on the basis of the stored association.

The reference proxy in accordance with the invention can in this respect form a part of the integration system. The reference proxy is in this respect preferably located downstream of the actual integration and re-references all references in the component and of the sensor integrated therein.

In a preferred embodiment of the present invention, the sensor transmits a report and/or recognized modifications to a further system on its execution on the client system. Such a procedure has the advantage that the sensor itself can be designed as relatively simple since the evaluation of the report or of the recognized modifications does not have to take place in the sensor itself.

In a preferred embodiment, the sensor in this respect transmits modified or added elements of the component completely to the further system. Alternatively, the sensor can transmit the complete component to the further system in the case of a modification of the component. The further system hereby has the possibility of carrying out a comprehensive analysis of the recognized modifications or of the component.

Provision can furthermore be made that the report contains an identifier of the delivery process with respect to which the report is made. The report and possible modifications can hereby be associated with the corresponding component.

The sensor in accordance with the invention can contain information on the delivered state of the component and can compare it with the current state of the component. This makes it possible for the sensor to recognize in a particularly simple manner a modification of the component which has taken place after the delivery. The information on the supplied state of the component can in particular be structural information.

Provision can furthermore be made that the sensor recognizes modifications with respect to a document object model of the component. Such a document object model is in particular present in HTML documents and contains all the constituent parts of the HTML component. Modifications of the component can therefore be recognized with reference to the document object model and in particular changed and/or modified elements of the component can be recognized.

Provision can furthermore be made in accordance with the invention that the sensor is configurable such that the check is restricted to part regions of the delivered component. Such a restriction to part regions of the delivered component prevents unproblematic modifications in an uncritical part region of the delivered component, occurring, for example, due to browser plug-ins, result in a report of a modification by the sensor.

The sensor can furthermore have a filter function for the exclusion of specific modifications. Such a filter function likewise prevents known, unproblematic modifications from being reported by the sensor. The filter function can in this respect in particular be implemented in the form of a white list of permitted modifications.

In a possible embodiment of the present invention, the system comprises an acceptance system which receives information from the integration system and/or from the sensor and which preferably stores and/or forwards it.

The acceptance system can preferably recognize with reference to the information whether the integration of the sensor and/or the execution of the sensor on the client system has taken place. The acceptance system thus allows a monitoring of the proper function of the sensor and thus likewise serves the increase of security.

The integration system is in this respect preferably configured such that it transmits a message to the acceptance system for every integration. The message preferably comprises an identifier of the delivery process. The acceptance system thus receives information on all the components delivered with an integrated sensor.

The acceptance system preferably stores the information received from the integration system and in particular an identifier for each delivery process. Provision is preferably made in this respect that the acceptance system stores the information received from the integration system together with some time information. Alternatively or additionally, the information obtained from the integration system can already include time information. The acceptance system is therefore aware due to the stored information when a specific component was delivered.

Provision can furthermore be made that the sensor transmits a report to the acceptance system on its execution. The report is this respect preferably transmitted to the acceptance system irrespective of whether a modification was recognized or not. If no modification was recognized, this is communicated via a corresponding report. If, in contrast, a modification was recognized, the report preferably includes information on the recognized modifications and in particular, as described in more detail above, the complete modification or the complete modified component. The report further preferably comprises an identifier of the delivery process. The report can hereby be associated with the corresponding component within the acceptance system.

The acceptance system preferably compares the information received from the sensor with stored information, in particular with the information which the acceptance system has received from the integration system.

Provision is in this respect preferably made that the acceptance system compares an identifier of the delivery process received from the sensor with stored identifiers delivered by the integration unit.

Provision is furthermore preferably made that the acceptance system interprets absent information or an absent report from a sensor as a modification or removal of the sensor. In this respect, absent information is preferably recognized with reference to the stored time information. If the acceptance system in this respect recognizes absent information from a sensor and thus a modification, it preferably transmits a corresponding message either to a downstream evaluation system and/or to the server system.

Provision can in this respect in particular be made that the acceptance system interprets an absent report as a modification of the sensor and preferably outputs a corresponding message.

The system in accordance with the invention comprises, in a further preferred embodiment, an evaluation system which evaluates the modifications recognized by the sensor.

The system is in this respect preferably configured such that the evaluation system completely receives modified or added elements of the component. Alternatively or additionally, the evaluation system can also receive the complete component in the event of a modification recognized by the sensor. In accordance with the invention, the evaluation system can hereby carry out an exact analysis of the modifications.

The evaluation system preferably receives the information on the recognized modifications and in particular the modified elements and the modified component from the acceptance system in this respect. The acceptance system in this respect in particular generates a new evaluation task in the event that a report of the sensor signals a modification and transmits it onward to the evaluation system.

The type of evaluation of the modifications is in this respect initially not restricted more closely. The evaluation in this respect preferably takes place in multiple stages.

The evaluation preferably also takes place at least by static analysis processes, preferably by a plurality of different static analysis processes.

In this respect, a comparison of the recognized modifications with a black list and/or with a white list can take place, i.e. a comparison of lists with already known, harmful or harmless modifications. An identification of unknown components which cannot be found either on the black list or on the while list can furthermore take place. The analysis can furthermore take place with reference to the references contained in the component and/or with reference to signatures and/or with reference to word lists.

The comparison with the black list can in this respect take place in a possible embodiment as a direct comparison and/or as a comparison after a normalization and/or as a similarity comparison.

A check can furthermore be made with respect to the references of the component whether a new or changed reference indicates a destination outside the predefined region, in particular a destination outside the server system. If this is the case, it can be considered a problematic modification.

Alternatively or additionally, however, dynamic analysis processes can also be used, in particular a simulation of the processing and/or execution of the component (sandboxing). The evaluation by machine learning processes can also be considered.

The use of static analysis processes is, however, preferred since they can be carried out substantially faster and require less effort than dynamic or machine learning processes.

Provision can furthermore be made that the evaluation system calculates a risk value of the modified component. This calculation of the risk value preferably takes place with reference to an analysis and/or classification of the recognized modifications. Provision can in this respect in particular be made that the recognized modifications are analyzed and/or classified, with a danger value being associated with each modification. The risk value of the modified component can then be calculated overall from the danger values of the individual recognized modifications. An estimate of the danger emanating from a modified component hereby results which is particularly simple to implement.

Provision can furthermore be made that the evaluation system transmits information on the danger of the modified component and in particular a risk value to the server system. An identifier of the delivery process is preferably transmitted together with the information on the danger or with the risk value so that a corresponding association can take place on the side of the server system.

The server system is furthermore preferably configured such that it initiates countermeasures with reference to the information of the evaluation system. The countermeasures, however, preferably do not comprise the aborting of the processing and/or execution of the modified component itself. It is, however, conceivable to suppress downstream processes such as an actual movement of money, a delivery of products or similar and/or to contact the customer.

In a possible embodiment of the present invention, the decision on countermeasures within the server system can take place with reference to the information of the evaluation system and preferably with reference to further information, in particular on the user behavior. In addition to the risk value determined by the evaluation system, other factors such as a difference in the detected behavior from a typical user behavior can hereby enter into the decision whether and if so which countermeasures are initiated. The decision on countermeasures can in this respect be taken both in an automated fashion and by a human decision-taker to whom the corresponding information is provided by the server system.

In a preferred embodiment of the present invention, the component is a website. Provision can furthermore be made that the client system is a web browser. The system in accordance with the invention is therefore preferably used for securing a website which is processed and/or executed by a web browser. It is insured in this respect by the integration of the sensor in accordance with the invention into the website that manipulations are recognized which take place after the delivery of the website by the server system.

The sensor is in this respect preferably a script which is integrated into the website. The integration into the website can in this respect also take place by the integration of one or more references to external destinations which then include the script.

The component delivered by the server system can in this respect in particular provide one of the following services: a web mail service, a payment service, an online shop and/or an access to a social network. Sensitive data which are secured against manipulation and interception by the sensor in accordance with the invention and its integration into the component are exchanged in all these services.

The present invention first relates to the just presented system for monitoring the integrity of a component delivered to a client system by a server system and processable and/or executable on the client system, said system comprising at least the sensor in accordance with the invention and an integration system in accordance with the invention and preferably furthermore comprising an acceptance system and/or an evaluation system in accordance with the present invention.

However, the subject matters of the present invention are also the individual components of the system in accordance with the invention, and thus in particular the sensor in accordance with the invention, the integration system in accordance with the invention, the acceptance system in accordance with the invention and the evaluation system in accordance with the invention.

The present invention thus in particular comprises a sensor for a system such as was presented above, wherein the sensor can be integrated into a component delivered to a client system by a server system and processable and/or executable on the client system and is configured such that it is executed on the processing and/or execution of the component and recognizes modifications of the component.

The sensor is in this respect preferably designed such as was already presented in more detail above with respect to the system.

The sensor can in particular transmit a report and/or recognized modifications to a further system on its execution. The sensor in this respect preferably transmits modified or added elements of the component completely to the further system and/or transmits the complete component to the further system in the case of a modification. The report further preferably comprises an identifier of the delivery process.

The sensor can furthermore contain information on the delivered state of the component and can compare it with the current state of the component. It is in particular structural information in this respect. Provision can furthermore be made that the sensor recognizes the modifications with reference to a document object model of the component and/or that the sensor comprises a copy of the delivered document object model of the component.

The sensor is further preferably configurable such that the check can be restricted to part regions of the delivered component. Alternatively or additionally, the sensor can comprise a filter function for excluding specific modifications, in particular in the form of a white list.

The present invention furthermore comprises an integration system for a system such as was presented in more detail above, wherein the integration system is configured such that it integrates a sensor into a component delivered to a client system by a server system and processable and/or executable on the client system.

The integration system, in this respect, is preferably designed such as was already presented in more detail above with respect to the total system.

Provision is in particular made in this respect that the integration system equips the sensor with information on the delivered state of the component and/or with an identifier of the delivery process. Alternatively or additionally, the integration system can integrate the sensor into the component such that the sensor can no longer be removed by subsequent manipulations. Provision can further alternatively or additionally be made that the integration system conceals the sensor as part of the integration or after the integration.

Provision can in particular be made that the integration system dynamically modifies the sensor for the integration. The integration system in this respect preferably changes variable names and/or function names and/or the position of the sensor in the component and/or the size of the sensor. The change in this respect preferably takes place for a plurality of integration processes and preferably for every integration process in a different and/or random manner.

Provision can furthermore be made that the integration system changes both the sensor and one or more constituent parts of the delivered component for the purpose of concealment. The change also preferably takes place here in a plurality of integration processes and preferably in every integration process in a different and/or random manner.

The integration system can furthermore encode the sensor and/or one or more constituent parts of the delivered component and preferably the total program code of the delivered component as part of the integration of the sensor. The encoded constituent parts preferably only get their original sense back in the processing and/or execution of the component.

The integration system preferably transmits a message to an acceptance system for every integration, wherein the message preferably comprises an identifier of the delivery process.

Provision can furthermore be made that the integration system comprises a reference proxy which changes references of the sensor and/or of the delivered component to external destinations before the delivery of the component to the client system and/or addresses them to itself. The change and/or addressing in this respect preferably takes place with a plurality of delivered components and preferably with each delivered component in a different and/or random manner.

The reference proxy preferably, on the call of the changed reference and/or of the references addressed to itself, forwards the call to the original references. Alternatively or additionally, the reference proxy can store an association between the changed references and/or the references addressed to itself and the original references together with an identifier for the respective delivery process.

The present invention furthermore preferably comprises an acceptance system for a system such as was presented above, wherein the acceptance system is configured such that it receives information from the integration system and/or from the sensor and stores it and/or forwards it.

The acceptance system is in this respect preferably designed such as was already presented in more detail above with respect to the total system.

The acceptance system can in particular recognize by the information whether the integration of the sensor and/or the execution of the sensor on the client system has taken place. The acceptance system preferably stores the information received from the integration system and in particular an identifier for each delivery procedure. The acceptance system in this respect preferably stores the information obtained from the integration system together with time information and/or the information obtained from the integration system already includes time information which is stored.

The acceptance system further preferably compares the information obtained from the sensor with stored information. The acceptance system in this respect in particular compares an identifier of the delivery process obtained from the sensor with stored identifiers delivered by the integration unit. Provision can furthermore be made that the acceptance system interprets absent information from a sensor as a modification of the sensor. Absent information is in this respect preferably recognized with reference to the stored time information.

The acceptance system preferably transmits an evaluation job to an evaluation system in the case of a modification identified by the sensor and/or in the case of a modification identified by the acceptance system.

The present invention furthermore comprises an evaluation system for a system such as was described in more detail above, wherein the evaluation system is configured such that it evaluates the modifications recognized by the sensor.

The evaluation system is in this respect preferably designed such as was already presented in more detail above with respect to the total system.

Provision can in particular be made that the evaluation system completely receives and evaluates modified or added elements of the component and/or receives and/or evaluates the complete component in the case of a modification.

The evaluation can in this respect take place in multiple stages.

The evaluation can in particular take place by static analysis processes, in particular by comparison with a black list and/or with a white list and/or an identification of unknown components and/or using references and/or signatures and/or word lists. In a preferred embodiment of the present invention, the comparison with the black list can be carried out as a direct comparison and/or as a comparison after normalization and/or as a similarity comparison. A check can further preferably be made whether new or changed references to a destination outside a predefined region, in particular outside the server system, are present.

The evaluation can also take place by dynamic analysis processes, in particular by the simulation of the processing and/or execution of the component and/or by machine learning processes.

The evaluation system preferably calculates a risk value of the modified component. This in particular takes place with reference to an analysis and/or to a classification of the recognized modifications. Provision can in particular be made in this respect that the recognized modifications are analyzed and/or classified and that a danger value is associated with each modification, with the risk value of the modified component overall then being calculated from said danger value. Provision can furthermore be made that the evaluation system transmits information on the danger of the modified component and in particular a risk value to the server system.

The acceptance system in accordance with the invention and the evaluation system in accordance with the invention are in this respect each per se and independently of one another subjects of the present invention. The combination of an acceptance system in accordance with the invention and of an evaluation system in accordance with the invention is furthermore also a subject of the present invention.

All constituent parts of the system in accordance with the invention preferably work automatically and thus implement the system in accordance with the invention or carry out the process in accordance with the invention automatically. The individual components are in this respect provided by software and/or hardware.

In addition to the system in accordance with the invention and its components, the present invention furthermore comprises a corresponding process.

The present invention in this respect in particular comprises a method for monitoring the integrity of a component delivered by a server system and by a client system and processable and/or executable on the client system. In this respect, the sensor is integrated into the component delivered to the client system by the server system, wherein the sensor is executed on the processing and/or execution of the component and recognizes modifications of the component.

The method in accordance with the invention preferably takes place such as was already presented in more detail above with respect to the system in accordance with the invention. The method in accordance with the invention can in this respect in particular be executed using a system in accordance with the invention and/or using one of the above-described components of such a system.

The present invention will now be explained in more detail with reference to embodiments and to drawings.

DETAILED DESCRIPTION

Figure 1:
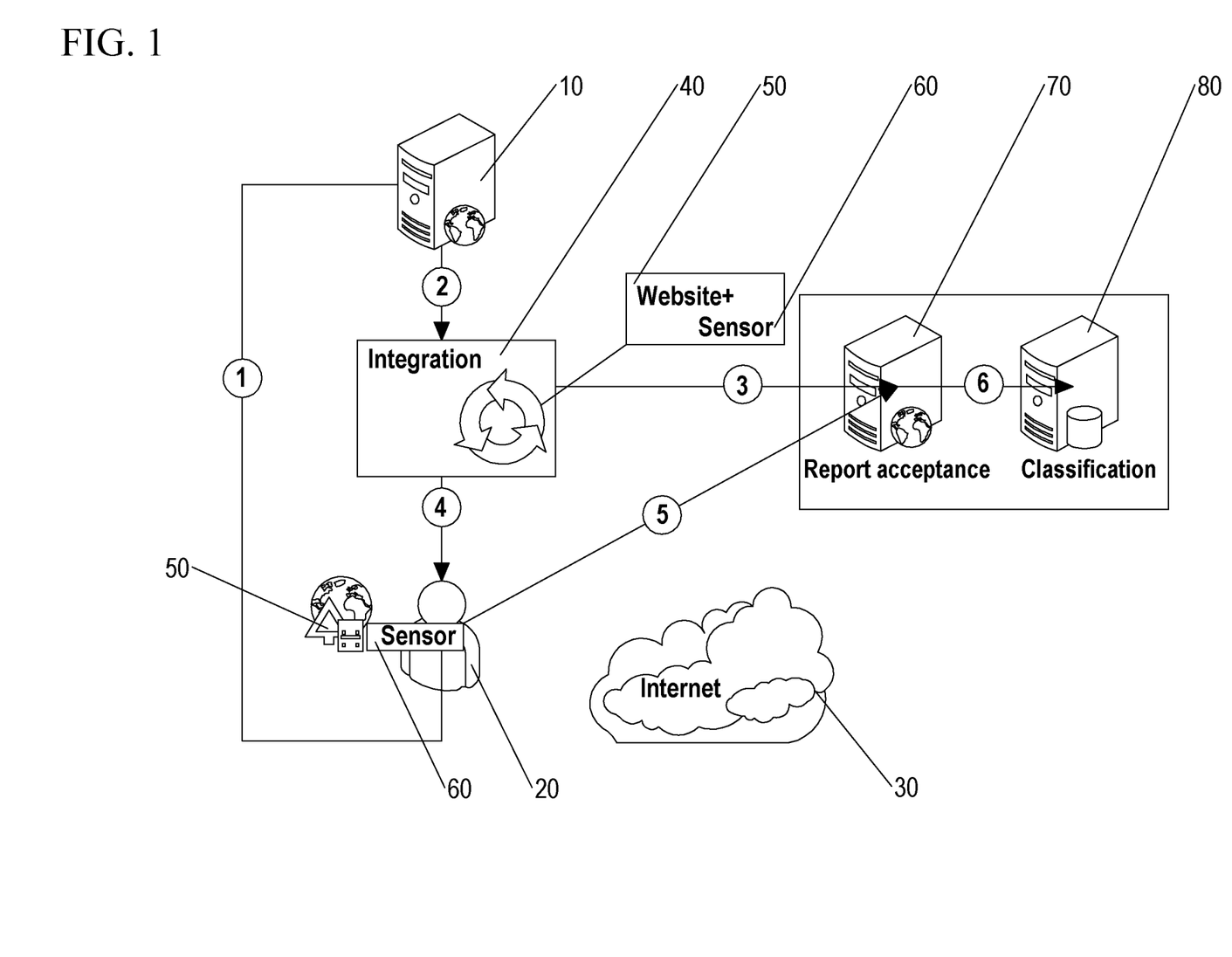
FIG. 1 shows a first embodiment of a system and method in accordance with the invention.
Figure 2:
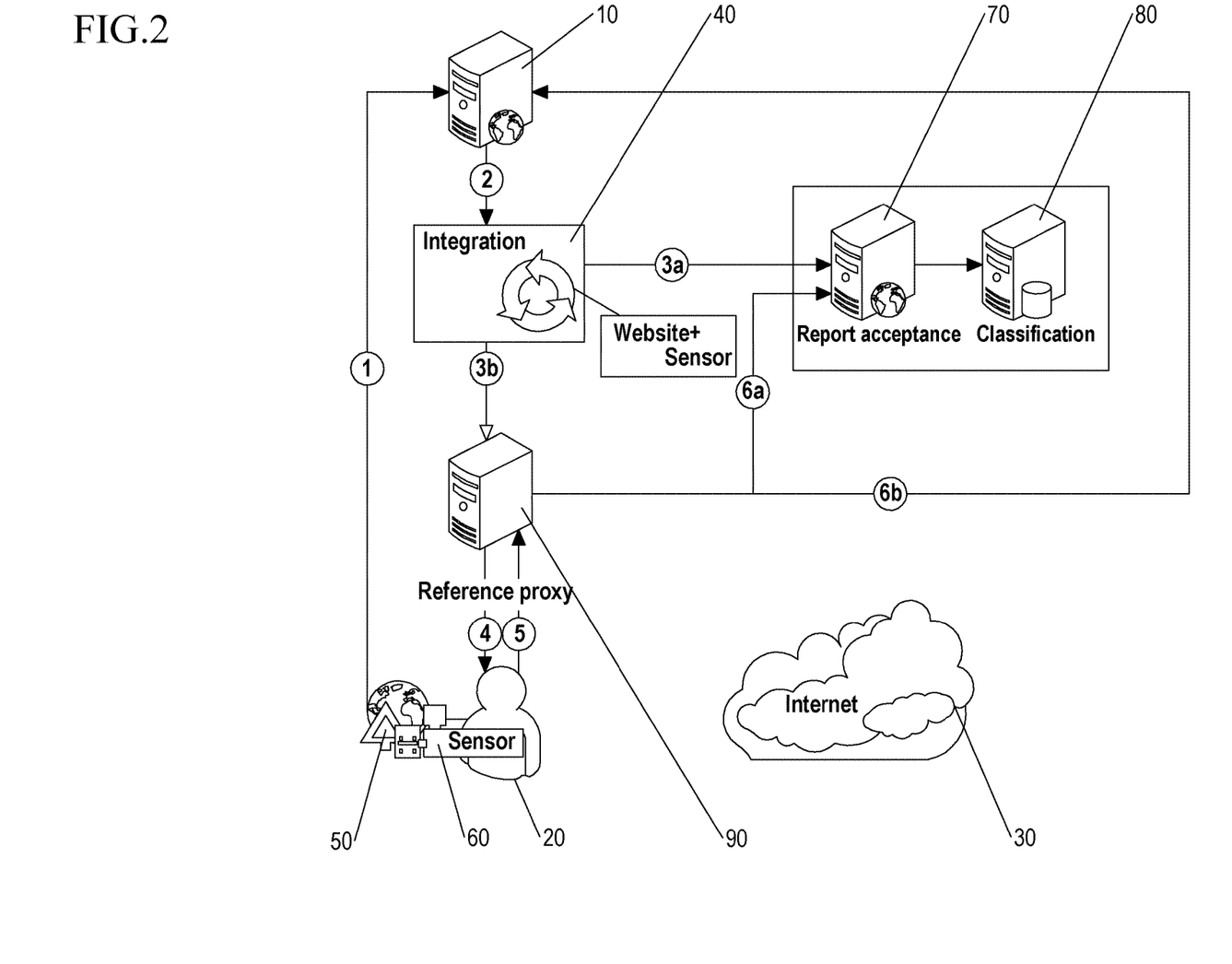
FIG. 2 shows a second embodiment of a system and method in accordance with the invention.

Two embodiments of a system in accordance with the invention are shown in FIGS. 1 and 2. The embodiments in this respect simultaneously show embodiments of the components of the system in accordance with the invention as well as of the method in accordance with the invention.

Both embodiments each show a system for monitoring the integrity of a component 50 delivered to a client system 20 by a server system 10 and processable and/or executable on the client system 20, wherein the component in the embodiment is a website which is transmitted to a browser working as a client system 20 by the server system 10 working as a web server. The communication between the web server 10 and the browser 20 in this respect takes place over the internet which is shown schematically as a cloud 30.

The embodiment of the system in accordance with the invention shown both in FIG. 1 and in FIG. 2 in this respect initially comprises the following components:

An integration system 40 which integrates a sensor 60 into an existing website 50 which is transmitted to the browser 20 by the web server 10. The integration can take place by the web server 10 or by an interposed proxy or on the client side.

A sensor 60 which can be integrated into the website 50 and determines modifications there on the execution of the website. The sensor can be implemented, for example, via JavaScript.

An acceptance system 70 which is called a "report acceptance" in the embodiment and to which the sensor component 60 transmits determined website changes, wherein the acceptance system 70 receives and stores the reports.

An evaluation system 80 which is called as "classification" and which examines and classifies the data stored by the acceptance system 70 by attack patterns. The analysis process can run in multiple stages in this respect.

The service operator can initiate suitable measures in dependence on the analysis result. The operator of a web store can, for example, stop the delivery of ordered goods if the account of the customer may have been stolen. Contact can be made with affected customers and the customer's account may optionally be blocked temporarily.

In this respect, the embodiment shown FIG. 2 differs from the embodiment shown in FIG. 1 by a further, additional constituent part.

A reference proxy server 90 which changes references in the original elements of the website 50 delivered by the web server 50 and changes them in the elements of the sensor 60 and indicates the reference proxy server as a new destination. On a call of such a reference, the reference proxy server 90 forwards the call to the original destination. The new references are in this respect preferably allocated randomly. The purpose of the reference proxy server is the concealment of references to prevent an identification of references of the sensor, in particular references to the reception system 70 of the sensor.

In the second embodiment in FIG. 2, the reference proxy server 90 in this respect represents an additional component added to the embodiment shown in FIG. 1. The embodiment shown in FIG. 2 otherwise corresponds to the embodiment shown in FIG. 1.

The communication between the individual constituent parts in this respect takes place as follows in the first embodiment in FIG. 1:

1. The client system 20 requests the website of the service operator.
2. The web server 10 of the service operator delivers the requested website.
3. The sensor 60 is integrated into the website 50 in the integration system 40. If the integration of the sensor 60 was successful, this is signaled to the acceptance system 70.
4. The original website 50, including the integrated sensor 60, is transmitted to the customer.
5. On the execution of the website 50, the sensor 60 determines modifications of the website and transmits a report with recognized website modifications to the acceptance system 70.
6. The acceptance system 70 advises the evaluation system 80 that a new analysis job is available.

The communication between the individual constituent parts of the system in accordance with the second embodiment in FIG. 2 takes place as follows, in contrast:

1. The client system 20 requests the website of the service operator.
2. The web server 10 of the service operator delivers the requested website 50.
3a. The integration system 40 integrates the sensor 60 into the website 50. On a successful integration of the sensor, this is signaled to the acceptance system 70.
3b. The original website 50, including the integrated sensor 60, is transmitted to the reference proxy server 90 by the integration system 40.
4. The reference proxy server 90 conceals the references in the original website 50, including the integrated sensor 60, and delivers it to the client system 20 with concealed references.
5. Subsequent requests of the client system 20 arrive at the reference proxy server 90 which triggers the concealed references. Two different paths exist from the reference proxy server 90,
6a. The sensor 60 is executed on the execution of the website 50 and determines website modifications which are transmitted to the acceptance system 70 via the reference proxy server 90.
6b. Other requests are forwarded by the reference proxy server 90 to their original destination within the server system 10.
7. The acceptance system 70 advises the evaluation system 80 that a new analysis job is available.

The individual constituent parts of the two embodiments in accordance with the invention of the system in accordance with the invention will be presented in more detail in the following, wherein the embodiment shown in FIG. 2 only differs from the embodiment shown in FIG. 1 by the additionally provided reference proxy server 90.

1. Integration

The integration system 40 integrates the sensor into the website 50 delivered by the server system 10. The sensor is implemented as software in the embodiment.

In this respect, the sensor is dynamically modified during or after the integration for purposes of concealment. The integration system 40 conceals the code of the sensor in that all variable names and function names are regularly replaced or are replaced in each delivered version with new, random values. In addition, the position of the sensor within the website can be changed regularly or even on every integration. It is furthermore possible to vary the size of the sensor component by the addition of padding.

The order of the references within the website including the sensor can furthermore be randomized to make it more difficult to distinguish references to the original code of the website and to the sensor code.

An alternative or additional possibility for concealment comprises dynamically modifying both the sensor and the other constituent parts of the website. For example, in this respect, all the elements of the website, including the sensor or the elements of the sensor, can have the same lengths or randomly distributed lengths by the addition of padding. Alternatively or additionally, the website or the code contained therein can be encoded so that the website or the code then only has its original sense again at the run time.

The concealment of the sensor or of the total component, including the sensor, serves the protection against static analysis processes since the latter can no longer identify the sensor due to the concealment so that a removal of the sensor becomes impossible.

The script elements of which the sensor is composed can furthermore be provided with attributes within the website which protect them from subsequent modifications. The attributes can in this respect in particular be predefined in the so-called document object model (DOM). The sensor preferably carries out corresponding actions for this purpose.

The sensor is connected to the website by the integration such that it can no longer subsequently be removed. This is due to the fact, on the one hand, that the distinguishing between the sensor and the original constituent parts of the website is no longer possible afterward. A removal of the sensor by the random switching off of individual elements of the website is likewise hardly possible since a random switching off of elements would have the result with high certainty that originally delivered scripts are also deleted which are essential for the running capability of the website. The sensor is thus entwined so much with the original scripts that a run capability is only present with high certainty together with the sensor.

After an integration has taken place, the integration system 40 transmits a heartbeat to the acceptance system 70. The heartbeat in this respect comprises an identifier for the delivery procedure. This identifier is also integrated into the sensor such that the latter can utilize the identifier for the association of reports. The sensor is furthermore equipped with information on the structure of the delivered website, for example with a copy of the document object model.

2. Sensor

The sensor 60 is implemented as software which is integrated into the delivered website 50 and which is likewise executed on executing the website on the client system 20.

The sensor can in this respect, for example, be implemented via JavaScript. In this respect, the sensor comprises one or more scripts which are executed on the execution of the website. The scripts can in this respect be integrated either directly into the website or via references.

The sensor 60 checks the website for modifications on its execution. In this respect, the current document object model is in particular checked for modifications, in particular in that a stored copy of the unmodified document object model is compared with the current document object model.

On its execution, the sensor transmits a report to the acceptance system 70. In this respect, the report on the one hand includes the identifier of the delivery procedure and on the other hand a communication whether modifications were found or not. If modifications were found, either the modified or added elements of the website are sent completely to the acceptance system 70 or the complete modified website. A closer analysis of the modifications by the sensor 60 is therefore not necessary and can take place in the evaluation system 80.

The sensor 60 is, however, configurable such that the check of the website can be restricted to part regions of the website. It is hereby prevented that regions which are not critical and in which modifications often occur are likewise checked and therefore result in superfluous reports of modifications.

The sensor can furthermore comprise a filter function to exclude frequently occurring modifications, for example as the result of a white list. Unnecessary notices of modifications which are known to be unproblematic are also hereby avoided.

In this respect, on its execution on the client system 20, the sensor 60 carries out actions according to which it can no longer be removed by subsequent modifications. Corresponding attributes are in particular predefined in the document object model for this purpose such that a subsequent modification is no longer possible.

3. Reference Proxy

The reference proxy server 90 serves to conceal the references to external destinations contained in the original website and in the sensor to make a distinction between the elements of the website and the sensor more difficult.

The reference proxy server 90 is in this respect arranged between the integration system 40 and the client system 20. The website with the integrated sensor is delivered by the integration system 40 to the reference proxy server 90 which replaces all the original references included there with new references directed to the reference proxy server 90. The new references are in this respect preferably allocated randomly.

Calls of these references on the execution of the website from the client system 20 are then forwarded to the original destination by the reference proxy server 90. It they are in this respect references of the original website, they are forwarded to the original destination in the server system 10. If they are in contrast references of the sensor, their original destination is typically the acceptance system 70 to which they are forwarded.

The references are in particular URLs to external code, in particular to JavaScript. The references of the original code and of the sensor code can no longer be distinguished due to the reference proxy server 90.

4. Acceptance System (Report)

As already described above, the integration system 40 transmits a heartbeat to the acceptance system 70, which is stored by the acceptance system 70, once integration has taken place. The stored information in this respect includes an identifier of the delivery procedure on the one hand and time information on the other hand.

On its execution, the sensor 60 furthermore transmits a report to the acceptance system 70 which can be associated with the heartbeats of the integration via the identifier.

The acceptance system 70 can therefore recognize whether the integration of the sensor was able to take place by the integration system and whether the execution of the sensor on the client system 20 had taken place. The acceptance system 70 in this respect in particular checks at regular intervals whether all the sensors which were delivered in accordance with the heartbeats output by the integration system 40 were also actually executed. An absent report after an integration heartbeat has occurred is interpreted by the acceptance system 70 such that the processing/execution of the sensor was prevented by modifications of the website. An absent report is therefore considered as a modification of the website and is treated accordingly.

In the event of a recognized modification, the reception system 70 furthermore accepts the information included thereon in the report of the sensor 60 and stores it. The corresponding information is furthermore handed over to the evaluation system 80 in the form of an analysis job.

5. Evaluation system (Classification)

The data on the modification stored by the acceptance system 70 are examined for attack patterns by the evaluation system 80. The modifications are furthermore classified. The following can result as the analysis result for every single recognized modification:

Attack pattern found

Harmless page modification found (e.g. by browser plug-ins)

Unknown page modification

In this respect, the following possibilities for evaluation the modifications result, with the static evaluation possibilities in particular being preferred due to the better speed and the small effort. The analysis process can take place in multiple stages in this respect.

a) Static evaluation

The individual modifications can be analyzed and/or classified by one or more of the following static evaluation processes:

i) Black list

A comparison of the recognized modifications with known, malicious modifications can take place here. The comparison can in this respect be carried out as a direct comparison, a comparison after normalization or as a similarity comparison.

ii) White list

A comparison of the recognized modifications with known, harmless modifications can take place here.

iii) Unknown components

If a modified component cannot be associated either with the black list or with the white list, it can be classified as unknown and thus as at least potentially dangerous.

iv) Reference analysis

The references included in the modified component can furthermore be analyzed. A check can in particular be made in this respect whether the new or changed references point to a destination outside a predefined region, in particular to a destination outside the original service. This indicates a dangerous modification.

v) Signatures and word lists

A static evaluation can further take place with reference to signatures and word lists b) Dynamic evaluation Alternatively or additionally, a dynamic evaluation of the modified component can take place in that the processing or execution is simulated (sandboxing).

c) Machine learning process

An evaluation is furthermore also conceivable via machine learning processes. However, an effort is likewise required here which is substantially increased with respect to static evaluation processes.

The evaluation system 80 calculates a risk value of the modified website, i.e. a value which quantifies the danger emanating from the modified website overall.

For this purpose, the individual modifications are preferably analyzed and classified and a single danger value is then associated with every single modification. The risk value of the modified website is then determined overall with reference to the single danger values.

The risk value is then reported to the server system 10 by the evaluation system 80 together with the identifier of the delivery procedure. The service operator can then initiate suitable measures in dependence on the risk value. This can be done either in an automated fashion or by hand. The measures are in this respect preferably not only made in dependence on the risk value prepared by the evaluation system 80, but also on further data, for example on the usual user behavior.

The system in accordance with the invention can be used to increase safety in a number of applications, in particular with web mail services, payment services, online stores and social networks.

The present invention in this respect provides a protection technology which is admittedly carried out on the client and can therefore recognize the modifications taking place in this region, but which can be delivered by the service operator without the customer himself having to become independently active. The integration of the sensor in this respect in particular takes place at the server side or by an interposed proxy and is not recognizable for the customer (or possible attackers).

The invention claimed is:

1. A system for monitoring an integrity of a software component delivered to a client system by a server system, the component being at least one out of processed and executed on the client system, wherein the system comprises:
the client system;
an integration system;
a sensor;
the server system;
wherein the integration system is implemented as software and integrates the sensor into the component delivered to the client system by the server system; and
wherein the sensor is implemented as software and is at least one out of processed and executed on the at least one out of processing and execution of the component delivered to the client system by the server system;
wherein the sensor recognizes modifications of the component containing the sensor;
wherein, on its execution, the sensor transmits recognized modifications to an evaluation system arranged remotely from the client system, wherein the sensor transmits a complete copy of at least one out of the component and modified or added elements of the component to the evaluation system;
wherein the evaluation system is implemented as software and arranged remotely from the client system which evaluates the modifications recognized by the sensor;
wherein the evaluation system receives a complete copy of at least one out of the component and modified or added elements of the component in case of a modification; and
wherein the evaluation system transmits an overall risk value of the modified component to the server system.

2. The system of claim 1, wherein for each delivery of the component to the client system, the integration system equips the sensor with information on a delivered state of the component and with an identifier for the delivery, wherein the sensor compares the information on the delivered state of the component with a current state of the component on at least one out of processing and execution of the component on the client system.

3. The system of claim 1, having a reference proxy server which changes original references of the sensor and of the delivered component to changed references and addresses them to itself before the delivery of the component to the client system,
wherein, on a call of the changed references addressed to itself, the reference proxy server forwards the call to the original references;
wherein the reference proxy server stores an association between the changed references addressed to itself and the original references together with an identifier for the respective component.

4. The system of claim 1, wherein the component is a website and wherein the client system is a web browser.

5. The system of claim 1, wherein the sensor recognizes modifications by evaluating a document object model of the component.

6. The system of claim 1, comprising an acceptance system implemented as software and configured to receive information from the integration system and from the sensor, and an evaluation system implemented as software and configured to evaluate the modifications recognized by the sensor.

7. The system of claim 6, wherein the acceptance system transmits an evaluation job to an evaluation system in an event of a modification reported by a specific sensor or in the event of a modification recognized by the acceptance system;
wherein the evaluation system calculates an overall risk value of the modified component, wherein recognized modifications are at least one of analyzed and classified and a risk value is associated with each modification from which the overall risk value of the modified component is then calculated, wherein the evaluation system transmits information to the server system on the overall risk value of the modified component.

8. The system of claim 1, wherein the integration system transmits a message to a software acceptance system for each delivery of the component to a client system, wherein the message comprises an identifier for the delivery.

9. The system of claim 1, wherein the sensor is configured to restrict a check to part regions of the delivered component.

10. The system of claim 1, wherein the sensor comprises a filter function to exclude specific modifications.

11. The system of claim 1, wherein the sensor is formed by a software element, wherein a software element is integrated into the component as an element, wherein the integration includes one or more references to external destinations.

12. The system of claim 1, wherein the component provides one or more of the following services: web mail service, online banking, payment service, online store and access to a social network.

13. A system for monitoring an integrity of a software component delivered to a client system by a server system, the component being at least one out of processed and executed on the client system, wherein the system comprises:
the client system;
an integration system;
a sensor;
the server system;
wherein the integration system is implemented as software and integrates the sensor into the component delivered to the client system by the server system; and wherein the sensor is implemented as software and is at least one out of processed and executed on the at least one out of processing and execution of the component delivered to the client system by the server system;
wherein the sensor recognizes modifications of the component containing the sensor;
wherein due to integration of the sensor into the component, the sensor is no longer removable by subsequent manipulations and is concealed, wherein the integration system does at least one out of:
dynamically modifies the sensor for the integration, wherein the integration system changes at least one of variable names, function names, a position of the sensor in the component, and a size of the sensor, wherein the change takes place in at least one of a different and random manner for a plurality of integration processes;
changes both the sensor and one or more constituent parts of the delivered component for the purpose of concealment, wherein the change takes place in at least one out of the different and the random manner for the plurality of integration processes; and
encodes at least one out of the sensor and the one or more constituent parts of the delivered component as part of the integration of the sensor, wherein the encoded constituent parts are functionally equal to the original constituent parts on the processing and/or execution of the component.

14. A system for monitoring an integrity of a software component delivered to a client system by a server system, the component being at least one out of processed and executed on the client system, wherein the system comprises:
the client system;
an integration system;
a sensor;
the server system;
an acceptance system implemented as software and arranged remotely from the client system which receives information from the integration system and from the sensor;
wherein the integration system is implemented as software and integrates the sensor into the component delivered to the client system by the server system; and wherein the sensor is implemented as software and is at least one out of processed and executed on the at least one out of processing and execution of the component delivered to the client system by the server system;
wherein the sensor recognizes modifications of the component containing the sensor;
wherein, for each delivery of the component to a client system, the integration system transmits a message to the acceptance system, wherein the message comprises an identifier for the delivery, and also equips the sensor with the identifier for the delivery;
wherein the acceptance system stores the identifier for the delivery, together with time information;
wherein, on its execution, the sensor transmits a report to the acceptance system, wherein the report comprises the identifier for the delivery; and
wherein the acceptance system compares the identifier obtained from the sensor with stored identifiers delivered by the integration unit, wherein the acceptance system checks for each identifier delivered by the integration unit with reference to the stored time information whether it received a corresponding identifier transmitted from a specific sensor, and interprets an absence of a report from a specific sensor as a modification of the specific sensor.

15. The system of claim 14, wherein the acceptance system transmits an evaluation job to a software evaluation system in an event of a modification reported by the sensor or in the event of a modification recognized by the acceptance system.

16. An integration system for a system for monitoring integrity of a software component delivered to a client system by a server system, the integration system is implemented as software and configured to integrate a sensor into the component delivered to the client system by the server system, wherein the sensor is implemented as software and is at least one out of processed and executed on at least one out of processing and execution of the component delivered to the client system by the server system and recognizes modifications of the component;
wherein the integration system comprises a reference proxy server which changes references of the sensor and of the delivered component to external destinations before the delivery of the component to the client system and addresses them to itself, wherein the change and addressing takes place in at least one out of a different and random manner with a plurality of components and with each component;
wherein, on a call of the modified references addressed to itself, the reference proxy server forwards the call to the original references; and
wherein the reference proxy server stores an association between the changed references addressed to itself and the original references together with an identifier for the respective component.

17. A method for monitoring integrity of a component delivered to a client system by a server system, the component being at least one out of processed and executed on the client system, wherein the server system comprises an integration system and a sensor,
wherein the sensor is integrated into the component delivered to the client system by the server system; and
wherein the sensor is executed on the at least one out of processing and execution of the component and recognizes modifications of the component containing the sensor;
wherein, on its execution, the sensor transmits recognized modifications to an evaluation system arranged remotely from the client system, wherein the sensor transmits a complete copy of at least one out of the component and modified or added elements of the component to the evaluation system;

wherein the evaluation system is implemented as software and arranged remotely from the client system which evaluates the modifications recognized by the sensor;

wherein the evaluation system receives a complete copy of at least one out of the component and modified or added elements of the component in case of a modification; and wherein the evaluation system transmits an overall risk value of the modified component to the server system.

* * * * *